United States Patent
Liu

(10) Patent No.: US 9,662,616 B2
(45) Date of Patent: May 30, 2017

(54) AROMATIC ALKYL-SUBSTITUTED POLYETHERSULFONE AND UV-CROSS-LINKED AROMATIC ALKYL-SUBSTITUTED POLYETHERSULFONE MEMBRANES FOR GAS SEPRATATIONS

(71) Applicant: UOP LLC, Des Plaines, IL (US)

(72) Inventor: Chunqing Liu, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 83 days.

(21) Appl. No.: 14/669,457

(22) Filed: Mar. 26, 2015

(65) Prior Publication Data

US 2016/0279580 A1 Sep. 29, 2016

(51) Int. Cl.
*B01D 53/22* (2006.01)
*B01D 71/68* (2006.01)
*B01D 69/12* (2006.01)
*B01D 61/36* (2006.01)
*B01D 69/02* (2006.01)
*B01D 71/80* (2006.01)
*B01D 67/00* (2006.01)
*B01D 69/06* (2006.01)
*B01D 69/08* (2006.01)

(52) U.S. Cl.
CPC ......... *B01D 69/125* (2013.01); *B01D 53/228* (2013.01); *B01D 69/02* (2013.01); *B01D 71/80* (2013.01); *B01D 61/362* (2013.01); *B01D 67/009* (2013.01); *B01D 69/06* (2013.01); *B01D 69/08* (2013.01); *B01D 71/68* (2013.01); *B01D 2256/16* (2013.01); *B01D 2256/18* (2013.01); *B01D 2256/245* (2013.01); *B01D 2257/102* (2013.01); *B01D 2257/108* (2013.01); *B01D 2257/504* (2013.01); *B01D 2257/702* (2013.01); *B01D 2257/708* (2013.01); *B01D 2323/30* (2013.01); *B01D 2325/20* (2013.01)

(58) Field of Classification Search
CPC B01D 53/228; B01D 61/362; B01D 67/0081; B01D 69/125; B01D 71/68; B01D 2323/30; B01D 2323/345
See application file for complete search history.

(56) References Cited

U.S. PATENT DOCUMENTS

| | | | | |
|---|---|---|---|---|
| 5,196,604 A | * | 3/1993 | Feiring | B01D 71/68 568/32 |
| 5,393,323 A | * | 2/1995 | Simmons | B01D 53/228 95/45 |
| 5,556,539 A | * | 9/1996 | Mita | B01D 61/362 202/185.1 |
| 5,608,014 A | * | 3/1997 | Ekiner | B01D 71/68 525/432 |
| 5,917,137 A | | 6/1999 | Ekiner | |
| 7,485,173 B1 | * | 2/2009 | Liu | B01D 53/228 210/640 |
| 8,796,399 B2 | | 8/2014 | Brunelle et al. | |
| 2008/0142442 A1 | * | 6/2008 | Steiger | B01D 71/68 210/646 |
| 2010/0108607 A1 | * | 5/2010 | Yeager | B01D 71/68 210/654 |
| 2010/0270234 A1 | * | 10/2010 | Liu | B01D 53/228 210/500.27 |
| 2011/0077312 A1 | * | 3/2011 | Liu | B01D 53/228 521/27 |
| 2012/0322911 A1 | * | 12/2012 | Liu | B01D 53/228 522/164 |
| 2012/0323059 A1 | * | 12/2012 | Liu | B01D 53/228 585/818 |

FOREIGN PATENT DOCUMENTS

WO 2007039538 A1 4/2007

* cited by examiner

*Primary Examiner* — Jason M Greene

(57) ABSTRACT

The present invention provides high flux aromatic alkyl-substituted polyethersulfone membranes and methods for making and using these membranes for gas separations. The membranes may be fabricated into any known membrane configuration including a flat sheet or a hollow fiber. The present invention also provides high selectivity UV cross-linked aromatic alkyl-substituted polyethersulfone membranes and methods for making and using these membranes for gas separations.

19 Claims, No Drawings

AROMATIC ALKYL-SUBSTITUTED POLYETHERSULFONE AND UV-CROSS-LINKED AROMATIC ALKYL-SUBSTITUTED POLYETHERSULFONE MEMBRANES FOR GAS SEPRATATIONS

BACKGROUND OF THE INVENTION

This invention relates to high flux aromatic alkyl-substituted polyethersulfone membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes that have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_B$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 $GPU=10^{-6}$ $cm^3$ $(STP)/cm^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin" However, fabrication of defect-free high selectivity asymmetric integrally skinned gas separation membranes is difficult. The presence of nanopores or defects in the skin layer reduces the membrane selectivity. Sometimes the high shrinkage of the polymer membrane on cloth substrate during membrane casting and drying process results in unsuccessful fabrication of asymmetric integrally skinned polymeric gas separation membranes using phase inversion technique.

U.S. Pat. No. 5,917,137 and U.S. Pat. No. 5,608,014 disclosed gas separation membranes prepared from blend of polyethersulfone with aromatic polyimides, polyamides, or polyamide-imides. The blending of polyethersulfone with aromatic polyimides can improve polyimide membrane properties such as processability, contaminant resistance, and selectivity. However, aromatic polyethersulfone is only miscible with very limited numbers of aromatic polyimides. The immiscibility of aromatic polyethersulfone with most of the aromatic polyimides makes the blend of polyethersulfone and aromatic polyimides difficult to be fabricated into gas separation membranes.

WO 2007/039538 discloses a process for preparing homoblock co-polysulfones and polysulfones prepared therefrom. The block copolysulfones comprise at least two types of homoblocks, wherein each of the homoblock has an identical or different molecular weight of at least 1000. WO 2007/039538 does not teach a gas separation membrane prepared from said homoblock co-polysulfones.

U.S. Pat. No. 5,393,323 discloses aromatic polyethersulfone gas separation membranes, wherein the aromatic polyethersulfones are formed from aromatic alcohols of the formula A

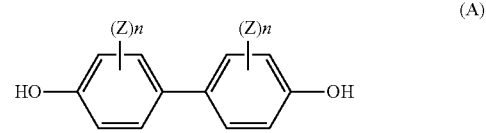

(A)

where Z is independently alkyl groups having 1 to 10 carbon atoms.

U.S. Pat. No. 8,796,399 discloses polyethersulfone compositions with high heat and good impact resistance, wherein the polyethersulfone consisting of formula B and formula C.

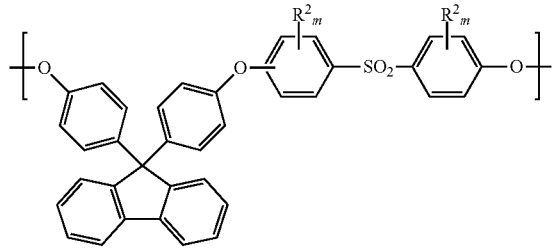

(B)

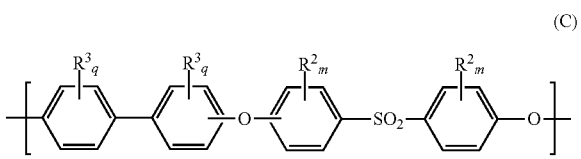

(C)

U.S. Pat. No. 8,796,399 does not disclose a gas separation membrane prepared from said polyethersulfone compositions.

The present invention discloses new high flux aromatic alkyl-substituted polyethersulfone membranes and methods for making and using these membranes for gas separations. The new high flux aromatic alkyl-substituted polyethersulfone membranes are made from aromatic alkyl-substituted polyethersulfone.

SUMMARY OF THE INVENTION

The invention discloses novel high flux aromatic alkyl-substituted polyethersulfone membranes and methods for making and using these membranes for gas separations. The membranes may be fabricated into any known membrane configuration including a flat sheet or a hollow fiber. The present invention also provides novel high selectivity UV cross-linked aromatic alkyl-substituted polyethersulfone membranes and methods for making and using these membranes for gas separations.

The high flux aromatic alkyl-substituted polyethersulfone membrane described in the current invention is made from an aromatic alkyl-substituted polyethersulfone polymer comprising a plurality of repeating units of formula (I)

wherein $R_1$, $R_2$, $R_3$ and $R_4$ are independently alkyl groups having 1 to 12 carbon atoms; Preferably $R_1$, $R_2$, $R_3$ and $R_4$ are selected from the group consisting of methyl and tertiary butyl groups and mixtures thereof; Most preferably $R_1$, $R_2$, $R_3$ and $R_4$ are the same methyl groups; wherein m and n are independent integers and m is an integer from 0 to 500 and n is an integer from 2 to 500; and the molar ratio of m/n is in a range of 0:1 to 5:1.

The aromatic alkyl-substituted polyethersulfone polymers used for the preparation of high flux aromatic alkyl-substituted polyethersulfone membranes described in the current invention may include, but are not limited to, poly(bis(4-chlorophenyl) sulfone-bis(4-hydroxy-3,5-dimethylphenyl) sulfone) homopolymer derived from polycondensation reaction of bis(4-chlorophenyl)sulfone with bis(4-hydroxy-3,5-dimethylphenyl)sulfone, poly(bis(4-chlorophenyl)sulfone-bis(4-hydroxyphenyl)sulfone-bis(4-hydroxy-3,5-dimethylphenyl)sulfone) random copolymer derived from polycondensation reaction of bis(4-chlorophenyl) sulfone with a mixture of bis(4-hydroxyphenyl) sulfone and bis(4-hydroxy-3,5-dimethylphenyl)sulfone wherein the molar ratio of bis(4-hydroxyphenyl) sulfone to bis(4-hydroxy-3,5-dimethylphenyl) sulfone is in a range of 1:10 to 5:1.

The high flux aromatic alkyl-substituted polyethersulfone membranes described in the current invention are useful for a variety of separations and purifications of liquids and gases including separation of acid gases or hydrogen from natural gas, separations of sulfur from hydrocarbon fuels, separations of olefins and paraffins as well as other separations described herein.

DETAILED DESCRIPTION OF THE INVENTION

The present invention is for high flux aromatic alkyl-substituted polyethersulfone membranes and methods for making and using these membranes for gas separations.

An embodiment of the present invention is for high flux aromatic alkyl-substituted polyethersulfone membranes and UV cross-linked high selectivity aromatic alkyl-substituted polyethersulfone membranes prepared from the high flux aromatic alkyl-substituted polyethersulfone membranes via UV radiation.

The present invention describes a high flux aromatic alkyl-substituted polyethersulfone membrane formed from an aromatic alkyl-substituted polyethersulfone polymer comprising a plurality of repeating units of formula (I)

(I)

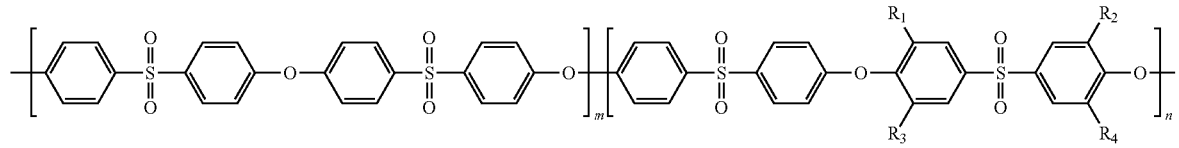

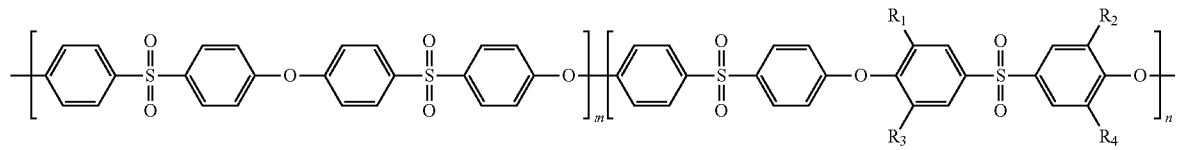

(I)

wherein $R_1$, $R_2$, $R_3$ and $R_4$ are independently alkyl groups having 1 to 12 carbon atoms; Preferably $R_1$, $R_2$, $R_3$ and $R_4$ are selected from the group consisting of methyl and tertiary butyl groups and mixtures thereof; Most preferably $R_1$, $R_2$, $R_3$ and $R_4$ are the same methyl groups; wherein m and n are independent integers and m is an integer from 0 to 500 and n is an integer from 2 to 500; and the molar ratio of m/n is in a range of 0:1 to 5:1.

The aromatic alkyl-substituted polyethersulfone polymer described in the present invention has a weight average molecular weight in the range of 10,000 to 1,000,000 Daltons, preferably between 20,000 to 500,000 Daltons. The aromatic alkyl-substituted polyethersulfone polymer described in the present invention can be an alkyl-substituted homopolyethersulfone synthesized via a polycondensation reaction of bis(4-chlorophenyl)sulfone with an alkyl-substituted aromatic diphenol such as bis(4-hydroxy-3,5-dimethylphenyl)sulfone. The aromatic alkyl-substituted polyethersulfone polymer described in the present invention can also be a random copolyethersulfone synthesized via a polycondensation reaction of bis(4-chlorophenyl) sulfone with a mixture of bis(4-hydroxyphenyl)sulfone and an alkyl-substituted aromatic diphenol such as bis(4-hydroxy-3,5-dimethylphenyl)sulfone.

The current invention further comprises a high flux aromatic alkyl-substituted polyethersulfone polymer membrane formed from an aromatic alkyl-substituted polyethersulfone polymer with formula (I) and a process for preparing the aromatic alkyl-substituted polyethersulfone polymer membrane. The process for preparing the high flux aromatic alkyl-substituted polyethersulfone polymer membrane comprises (a) making an aromatic alkyl-substituted polyethersulfone membrane dope solution comprising the aromatic alkyl-substituted polyethersulfone polymer, solvents which are miscible with water and can dissolve the alkyl-substituted polyethersulfone polymer, and non-solvents which cannot dissolve the aromatic alkyl-substituted polyethersulfone polymer; (b) fabricating the aromatic alkyl-substituted polyethersulfone membrane in either flat sheet or hollow fiber geometry by casting a thin layer of said aromatic alkyl-substituted polyethersulfone membrane dope solution onto a supporting substrate or by spinning said aromatic alkyl-substituted polyethersulfone membrane dope solution and a bore fluid simultaneously from an annular spinneret followed by solvent and non-solvent evaporating, coagulating, washing, and drying; and in some cases, (c) coating a high permeability material such as a fluoropolymer, a thermally curable silicone rubber, or a UV radiation curable epoxy silicone onto said aromatic alkyl-substituted polyethersulfone membrane.

The membrane dope formulation for the preparation of high flux aromatic alkyl-substituted polyethersulfone membranes for gas separations in the present invention comprises good solvents for the aromatic alkyl-substituted polyethersulfone polymer that can completely dissolve the polymer. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof. In some cases, the membrane dope formulation for the preparation of the aromatic alkyl-substituted polyethersulfone membranes for gas separations in the present invention also comprises poor solvents for the aromatic alkyl-substituted polyethersulfone polymer that cannot dissolve the polymer such as acetone, methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric aromatic alkyl-substituted polyethersulfone membranes with <200 nm super thin nonporous selective skin layer which results in high flux.

The invention further comprises a UV cross-linked aromatic alkyl-substituted polyethersulfone membrane formed from an aromatic alkyl-substituted polyethersulfone membrane described in the present invention. The UV cross-linked aromatic alkyl-substituted polyethersulfone membrane is prepared by UV cross-linking of the aromatic alkyl-substituted polyethersulfone membrane via UV radiation. The aromatic alkyl-substituted polyethersulfone polymers used for the preparation of the aromatic alkyl-substituted polyethersulfone membranes described in the current invention have UV cross-linkable sulfonyl and alkyl functional groups. The UV cross-linked aromatic alkyl-substituted polyethersulfone membranes comprise polyethersulfone polymer chain segments where at least part of these polymer chain segments are cross-linked to each other through possible direct covalent bonds by exposure to UV radiation. The cross-linking of the aromatic alkyl-substituted polyethersulfone membranes provides the membranes with improved selectivities and slightly decreased permeances compared to the corresponding uncross-linked aromatic alkyl-substituted polyethersulfone membranes.

The aromatic alkyl-substituted polyethersulfone membranes and the UV cross-linked aromatic alkyl-substituted polyethersulfone membranes of the invention may be fabricated into any known membrane configuration or form such as flat sheet or hollow fiber.

Some preferred examples of the aromatic alkyl-substituted polyethersulfone polymers used for the fabrication of the aromatic alkyl-substituted polyethersulfone membranes and the UV cross-linked aromatic alkyl-substituted polyethersulfone membranes of the present invention may be selected from the group consisting of poly(bis(4-chlorophenyl)sulfone-bis(4-hydroxy-3,5-dimethylphenyl) sulfone) homopolymer derived from polycondensation reaction of bis(4-chlorophenyl) sulfone with bis(4-hydroxy-3,5-dimethylphenyl)sulfone, poly(bis(4-chlorophenyl)sulfone-bis(4-hydroxyphenyl)sulfone-bis(4-hydroxy-3,5-dimethylphenyl) sulfone) random copolymer derived from polycondensation reaction of bis(4-chlorophenyl) sulfone with a mixture of bis(4-hydroxyphenyl)sulfone and bis(4-hydroxy-3,5-dimethylphenyl)sulfone wherein the molar ratio of bis(4-hydroxyphenyl) sulfone to bis(4-hydroxy-3,5-dimethylphenyl) sulfone is in a range of 1:10 to 5:1.

The UV cross-linked aromatic alkyl-substituted polyethersulfone membrane described in the present invention showed high selectivity and good permeability for a variety of gas separation applications such as $CO_2/CH_4$ and $H_2/CH_4$ separations. For example, the UV cross-linked aromatic poly(bis(4-chlorophenyl) sulfone-bis(4-hydroxy-3,5-dimethylphenyl)sulfone)homopolyethersulfone dense film (abbreviated as poly(DCDPS-TMDHDPS)) formed from aromatic poly(bis(4-chlorophenyl) sulfone-bis(4-hydroxy-3,5-dimethylphenyl)sulfone)homopolyethersulfone that was produced from a polycondensation reaction of bis(4-chlorophenyl) sulfone with bis(4-hydroxy-3,5-dimethylphenyl) sulfone has $CO_2$ permeability of 9.4 Barrers and high $CO_2/CH_4$ selectivity of 41 for $CO_2/CH_4$ separation. This UV cross-linked poly(DCDPS-TMDHDPS) dense film also has $H_2$ permeability of 39.8 Barrers and high $H_2/CH_4$ selectivity of 171 for $H_2/CH_4$ separation.

The invention also involves a process for separating at least one gas from a mixture of gases comprising providing the aromatic alkyl-substituted polyethersulfone membrane or the UV cross-linked aromatic alkyl-substituted polyethersulfone membrane described in the present invention; contacting the mixture of gases to one side of the aromatic alkyl-substituted polyethersulfone membrane or the UV cross-linked aromatic alkyl-substituted polyethersulfone membrane to cause at least one gas to permeate said membrane; and removing from an opposite side of said aromatic alkyl-substituted polyethersulfone membrane or the UV cross-linked aromatic alkyl-substituted polyethersulfone membrane a permeate gas composition comprising a portion of said at least one gas that permeated said membrane.

The aromatic alkyl-substituted polyethersulfone membrane or the UV cross-linked aromatic alkyl-substituted polyethersulfone membrane described in the present invention is especially useful in the purification, separation or adsorption of a particular species in the liquid or gas phase. In addition to separation of pairs of gases, the aromatic alkyl-substituted polyethersulfone membrane or the UV cross-linked aromatic alkyl-substituted polyethersulfone membrane described in the present invention may, for example, be used for the desalination of water by reverse osmosis or for the separation of proteins or other thermally unstable compounds, e.g. in the pharmaceutical and biotechnology industries. The aromatic alkyl-substituted polyethersulfone membrane or the UV cross-linked aromatic alkyl-substituted polyethersulfone membrane described in the present invention may also be used in fermenters and bioreactors to transport gases into the reaction vessel and transfer cell culture medium out of the vessel. Additionally, the aromatic alkyl-substituted polyethersulfone membrane or the UV cross-linked aromatic alkyl-substituted polyethersulfone membrane described in the present invention may be used for the removal of microorganisms from air or water streams, water purification, ethanol production in a continuous fermentation/membrane pervaporation system, and in detection or removal of trace compounds or metal salts in air or water streams.

The aromatic alkyl-substituted polyethersulfone membrane or the UV cross-linked aromatic alkyl-substituted polyethersulfone membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, xylene separations, iso/normal paraffin separations, liquid natural gas separations, $C_2$+ hydrocarbon recovery. Any given pair or group of gases that differ in molecular size, for example nitrogen and oxygen, carbon dioxide and methane, hydrogen and methane or carbon monoxide, helium and methane, can be separated using the aromatic alkyl-substituted polyethersulfone membrane or the UV cross-linked aromatic alkyl-substituted polyethersulfone membrane described in the present invention. More than two gases can be removed from a third gas. For example, some of the gas components which can be selectively removed from a raw natural gas using the aromatic alkyl-substituted polyethersulfone membrane or the UV cross-linked aromatic alkyl-substituted polyethersulfone membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the aromatic alkyl-substituted polyethersulfone membrane or the UV cross-linked aromatic alkyl-substituted polyethersulfone membrane of the present invention will range from about −20° to about 100° C., and most preferably, the effective operating temperature of the membranes of the present invention will range from about 25° to about 100° C.

The aromatic alkyl-substituted polyethersulfone membrane or the UV cross-linked aromatic alkyl-substituted polyethersulfone membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the aromatic alkyl-substituted polyethersulfone membrane or the UV cross-linked aromatic alkyl-substituted polyethersulfone membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The aromatic alkyl-substituted polyethersulfone membrane or the UV cross-linked aromatic alkyl-substituted polyethersulfone membrane described in the present invention may incorporate a species that adsorbs strongly to certain gases (e.g. cobalt porphyrins or phthalocyanines for $O_2$ or silver (I) for ethane) to facilitate their transport across the membrane.

The aromatic alkyl-substituted polyethersulfone membrane or the UV cross-linked aromatic alkyl-substituted polyethersulfone membrane described in the present invention also has immediate application to concentrate olefin in a paraffin/olefin stream for olefin cracking application. For example, the aromatic alkyl-substituted polyethersulfone membrane or the UV cross-linked aromatic alkyl-substituted polyethersulfone membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the aromatic alkyl-substituted polyethersulfone membrane or the UV cross-linked aromatic alkyl-substituted polyethersulfone membrane described in the present invention is for separating isoparaffin and normal paraffin in light paraffin isomerization and MaxEne™, a process from UOP LLC, Des Plaines, Ill., for enhancing the concentration of normal paraffin (n-paraffin) in the naphtha cracker feedstock, which can be then converted to ethylene.

The aromatic alkyl-substituted polyethersulfone membrane or the UV cross-linked aromatic alkyl-substituted polyethersulfone membrane described in the present invention can also be operated at high temperature to provide the sufficient dew point margin for natural gas upgrading (e.g, $CO_2$ removal from natural gas). The aromatic alkyl-substituted polyethersulfone membrane or the UV cross-linked aromatic alkyl-substituted polyethersulfone membrane described in the present invention can be used in either a single stage membrane or as the first or/and second stage membrane in a two stage membrane system for natural gas upgrading.

The aromatic alkyl-substituted polyethersulfone membrane or the UV cross-linked aromatic alkyl-substituted polyethersulfone membrane described in the present invention may also be used in the separation of liquid mixtures by pervaporation, such as in the removal of organic compounds (e. g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the aromatic alkyl-substituted polyethersulfone membrane or the UV cross-linked aromatic alkyl-substituted polyethersulfone membrane described in the present invention is the deep desulfurization of gasoline and diesel fuels by a pervaporation membrane process similar to the process described in U.S. Pat. No. 7,048,846, incorporated by reference herein in its entirety. The aromatic alkyl-substituted polyethersulfone membrane or the UV cross-linked aromatic alkyl-substituted polyethersulfone membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the aromatic alkyl-substituted polyethersulfone membrane or the UV cross-linked aromatic alkyl-substituted polyethersulfone membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Preparation of poly(bis(4-chlorophenyl) sulfone-bis (4-hydroxy-3,5-dimethylphenyl)sulfone)homopolyethersulfone (abbreviated as poly(DCDPS-TMDHDPS)) Dense Film Membrane Poly(bis(4-chlorophenyl) sulfone-bis(4-hydroxy-3,5-dimethylphenyl)sulfone)methyl-substituted homopolyethersulfone (abbreviated as poly(DCDPS-TMDHDPS)) was synthesized from the polycondensation reaction of bis(4-chlorophenyl) sulfone (DCDPS) with bis(4-hydroxy-3,5-dimethylphenyl) sulfone (TMDHDPS). 5.0 g of poly (DCDPS-TMDHDPS) was dissolved in 20.0 g of NMP solvent. The mixture was mechanically stirred for 2 hours to form a homogeneous casting dope. The resulting homogeneous casting dope was allowed to degas overnight. The poly(DCDPS-TMDHDPS) dense film membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was heated at 150° C. under vacuum for 48 hours to completely remove the residual solvents.

Example 2

Preparation of UV Cross-Linked Poly(DCDPS-TMDHDPS) Dense Film Membrane

The methyl-substituted homopolyethersulfone poly (DCDPS-TMDHDPS) dense film membrane prepared in Example 1 was further UV cross-linked by exposure to UV radiation using 254 nm wavelength UV light generated from a UV lamp for a radiation time of 10 min.

Example 3

Evaluation of Gas Separation Performance of Poly(DCDPS-TMDHDPS) Dense Film Membrane and UV Cross-Linked Poly(DCDPS-TMDHDPS) Dense Film Membrane

The poly(DCDPS-TMDHDPS) dense film membrane and UV cross-linked poly(DCDPS-TMDHDPS) dense film membrane were tested for $CO_2/CH_4$ and $H_2/CH_4$ separations at 50° C. under 791 kPa (100 psig) pure single feed gas pressure. The results show that the poly(DCDPS-TMDHDPS) dense film membrane has high $CO_2$ permeability of 19.6 Barrers and $CO_2/CH_4$ selectivity of 22.3 for $CO_2/CH_4$ separation and the UV cross-linked poly(DCDPS-TMDHDPS) dense film membrane shows significantly improved $CO_2/CH_4$ selectivity of 40.1 and good $CO_2$ permeability of 9.35 Barrers for $CO_2/CH_4$ separation. The UV cross-linked poly(DCDPS-TMDHDPS) dense film membrane also has $H_2$ permeability of 39.8 Barrers and high $H_2/CH_4$ selectivity of 170.8 for $H_2/CH_4$ separation.

Example 4

Preparation of poly(bis(4-chlorophenyl) sulfone-bis(4-hydroxyphenyl) sulfone-bis(4-hydroxy-3,5-dimethylphenyl)sulfone) random copolyethersulfone (abbreviated as poly(DCDPS-DHDPS-TMDHDPS-2-1)) Dense Film Membrane and Gas Separation Performance Evaluation

Poly(bis(4-chlorophenyl) sulfone-bis(4-hydroxyphenyl) sulfone-bis(4-hydroxy-3,5-dimethylphenyl) sulfone) random copolyethersulfone (abbreviated as poly(DCDPS-DHDPS-TMDHDPS-2-1)) was synthesized from the polycondensation reaction of bis(4-chlorophenyl)sulfone (DCDPS) with a mixture of bis(4-hydroxyphenyl) sulfone (DHDPS) and bis(4-hydroxy-3,5-dimethylphenyl) sulfone (TMDHDPS), wherein the molar ratio of DHDPS to TMDHDPS is 2:1. 5.0 g of poly(DCDPS-DHDPS-TMDHDPS-2-1) was dissolved in 20.0 g of NMP solvent. The mixture was mechanically stirred for 2 hours to form a homogeneous casting dope. The resulting homogeneous casting dope was allowed to degas overnight. The poly(DCDPS-DHDPS-TMDHDPS-2-1) dense film membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was heated at 150° C. under vacuum for 48 hours to completely remove the residual solvents.

The poly(DCDPS-DHDPS-TMDHDPS-2-1) dense film membrane was tested for $CO_2/CH_4$ and $H_2/CH_4$ separations at 50° C. under 791 kPa (100 psig) pure single feed gas pressure. The results show that the poly(DCDPS-DHDPS-TMDHDPS-2-1) dense film membrane has $CO_2$ permeability of 7.65 Barrers and $CO_2/CH_4$ selectivity of 24.9 for $CO_2/CH_4$ separation and has $H_2$ permeability of 18.7 Barrers and $H_2/CH_4$ selectivity of 60.8 for $H_2/CH_4$ separation.

Example 5

Fabrication of Poly(DCDPS-TMDHDPS) Asymmetric Flat Sheet Membrane

A poly(DCDPS-TMDHDPS) asymmetric flat sheet membrane was prepared from a casting dope comprising 38.5 g of poly(DCDPS-TMDHDPS), 38.0 g of 1,3-dioxolane, 74.5 g of NMP, and 3.0 g of n-decane. A film was cast on a Nylon cloth then gelled by immersion in a 0° C. water bath for about 10 minutes, and then annealed in a hot water bath at 86° C. for 10-15 minutes. The resulting wet membrane was dried in at a temperature between 70° and 90° C. to remove water. The dried asymmetric poly(DCDPS-TMDHDPS) flat sheet membrane was coated with an epoxy silicone solution containing 2-5 wt-% epoxy silicone in hexane. The epoxy silicone coating was exposed to a UV source for a period of 5 to 10 minutes at ambient temperature to cure the coating while the silicone solvent evaporated to produce the epoxy silicone coated poly(DCDPS-TMDHDPS) membrane of the present invention.

Example 6

Fabrication of Poly(DCDPS-TMDHDPS) Asymmetric Hollow Fiber Membrane

A poly(DCDPS-TMDHDPS) asymmetric hollow fiber membrane was prepared from a spinning dope comprising 25.5 g of poly(DCDPS-TMDHDPS), 8.5 g of 1,3-dioxolane and 63.0 g of NMP. The poly(DCDPS-TMDHDPS) spinning dope was extruded from the annulus of a hollow fiber membrane spinneret at a flow rate ranging from 0.7 to 3.0 mL/min. At the same time, a bore solution of 20 wt % $H_2O$/80 wt % NMP flowed from the inner passage of the spinneret at 1.2 to 3.8 mL/min to keep the nascent fiber from collapsing on itself. During extrusion, the dope and spinneret were controlled at 50° C. The nascent fiber passed through an air gap of 3 to 10 cm and then entered a water coagulation bath at approximately 3° C. Finally, the solidified hollow fiber membrane was wound on a take-up drum partially submersed in room temperature water at 8 to 30 m/min. The resulting poly(DCDPS-TMDHDPS) asymmetric hollow fiber membranes had a dense selective layer on the outside surface of the fibers.

The invention claimed is:

1. A high flux aromatic alkyl-substituted polyethersulfone membrane formed from an aromatic alkyl-substituted polyethersulfone copolymer comprising a plurality of repeating units of formula (I)

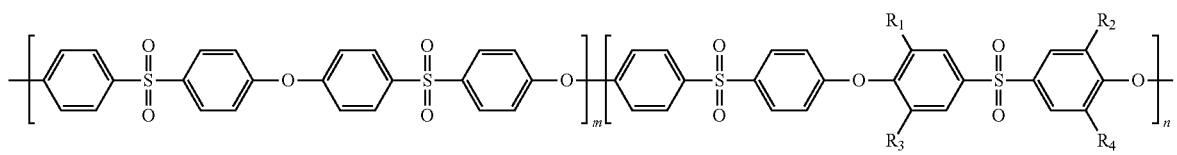

wherein $R_1$, $R_2$, $R_3$ and $R_4$ are independently alkyl groups having 1 to 12 carbon atoms wherein m and n are independent integers and m is an integer from 1 to 500 and n is an integer from 2 to 500; and the molar ratio of m/n is in a range of 1:10 to 5:1.

2. The aromatic alkyl-substituted polyethersulfone membrane of claim 1 wherein $R_1$, $R_2$, $R_3$ and $R_4$ are selected from the group consisting of methyl and tertiary butyl groups and mixtures thereof.

3. The aromatic alkyl-substituted polyethersulfone membrane of claim 1 wherein $R_1$, $R_2$, $R_3$ and $R_4$ are methyl groups.

4. The aromatic alkyl-substituted polyethersulfone membrane of claim 1 wherein said aromatic alkyl-substituted polyethersulfone copolymer is selected a random copolymer derived from polycondensation reaction of bis(4-chlorophenyl) sulfone with a mixture of bis(4-hydroxyphenyl) sulfone and bis(4-hydroxy-3,5-dimethylphenyl) sulfone wherein the molar ratio of bis(4-hydroxyphenyl) sulfone to bis(4-hydroxy-3,5-dimethylphenyl) sulfone is in a range of 1:10 to 5:1.

5. The aromatic alkyl-substituted polyethersulfone membrane of claim 1 wherein said aromatic alkyl-substituted polyethersulfone copolymer has been crosslinked.

6. The aromatic alkyl-substituted polyethersulfone membrane of claim 1 further comprising a species that adsorbs strongly to a particular gas.

7. A process for separating at least one gas from a mixture of gases comprising providing a high flux aromatic alkyl-substituted polyethersulfone membrane formed from an aromatic alkyl-substituted polyethersulfone copolymer comprising a plurality of repeating units of formula (I)

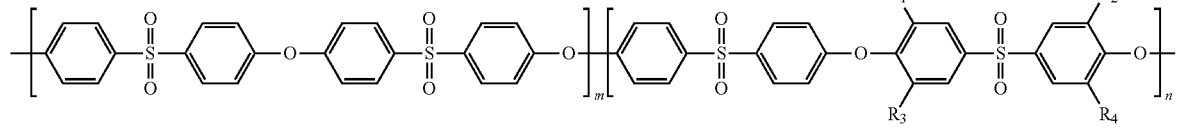

wherein $R_1$, $R_2$, $R_3$ and $R_4$ are independently alkyl groups having 1 to 12 carbon atoms wherein m and n are independent integers and m is an integer from 1 to 500 and n is an integer from 2 to 500; and the molar ratio of m/n is in a range of 1:10 to 5:1 or an UV cross-linked said aromatic alkyl-substituted polyethersulfone membrane; contacting the mixture of gases to one side of said aromatic alkyl-substituted polyethersulfone membrane or the UV cross-linked said aromatic alkyl-substituted polyethersulfone membrane to cause at least one gas to permeate said membrane; and removing from an opposite side of said aromatic alkyl-substituted polyethersulfone membrane or the UV cross-linked said aromatic alkyl-substituted polyethersulfone membrane a permeate gas composition comprising a portion of said at least one gas that permeated said membrane.

8. The process of claim 7 wherein said mixture comprises a paraffin/olefin stream.

9. The process of claim 7 wherein said mixture comprises isoparaffins and normal paraffins.

10. The process of claim 7 wherein said mixture comprises carbon dioxide in natural gas.

11. The process of claim 7 wherein said mixture comprises hydrocarbon vapors and hydrogen.

12. The process of claim 7 wherein said mixture comprises volatile organic compounds.

13. The process of claim 7 wherein said mixture of gases comprises hydrogen, nitrogen, methane and argon or hydrogen from a refinery stream.

14. The process of claim 7 wherein said mixture of gases comprises olefin/paraffin separations selected from the group consisting of propylene/propane separations, xylene separations, and iso/normal paraffin separations.

15. The process of claim 7 wherein said mixture of gases is selected from the group consisting of nitrogen and oxygen, carbon dioxide and methane, hydrogen and methane or carbon monoxide, helium and methane.

16. The process of claim 7 wherein said mixture of gases is selected from the group consisting of carbon dioxide, oxygen, nitrogen, water vapor, hydrogen sulfide, helium, and other trace gases in a raw natural gas feed.

17. The process of claim 7 wherein said membrane is in a single stage membrane or in a first or second stage membrane of a two stage membrane system.

18. The process of claim 7 wherein said membrane is further used in separation of liquid mixtures by pervaporation.

19. The process of claim 18 wherein said liquid mixtures are selected from the group consisting of organic compounds in water; sulfur compounds in gasoline or diesel fuels; or mixtures of organic compounds selected from the group consisting of ethylacetate-ethanol, diethylether-ethanol, acetic acid-ethanol, benzene-ethanol, chloroform-ethanol, chloroform-methanol, acetone-isopropylether, allylalcohol-allyl ether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

* * * * *